Nov. 5, 1940.  A. J. KIZAUR  2,220,246
INSPECTION EQUIPMENT
Filed May 28, 1938  2 Sheets-Sheet 1
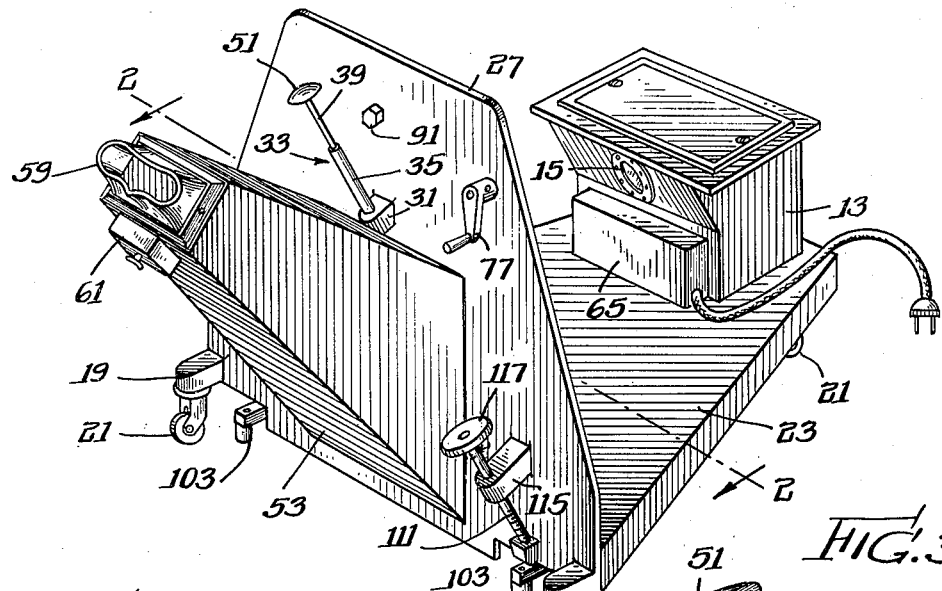
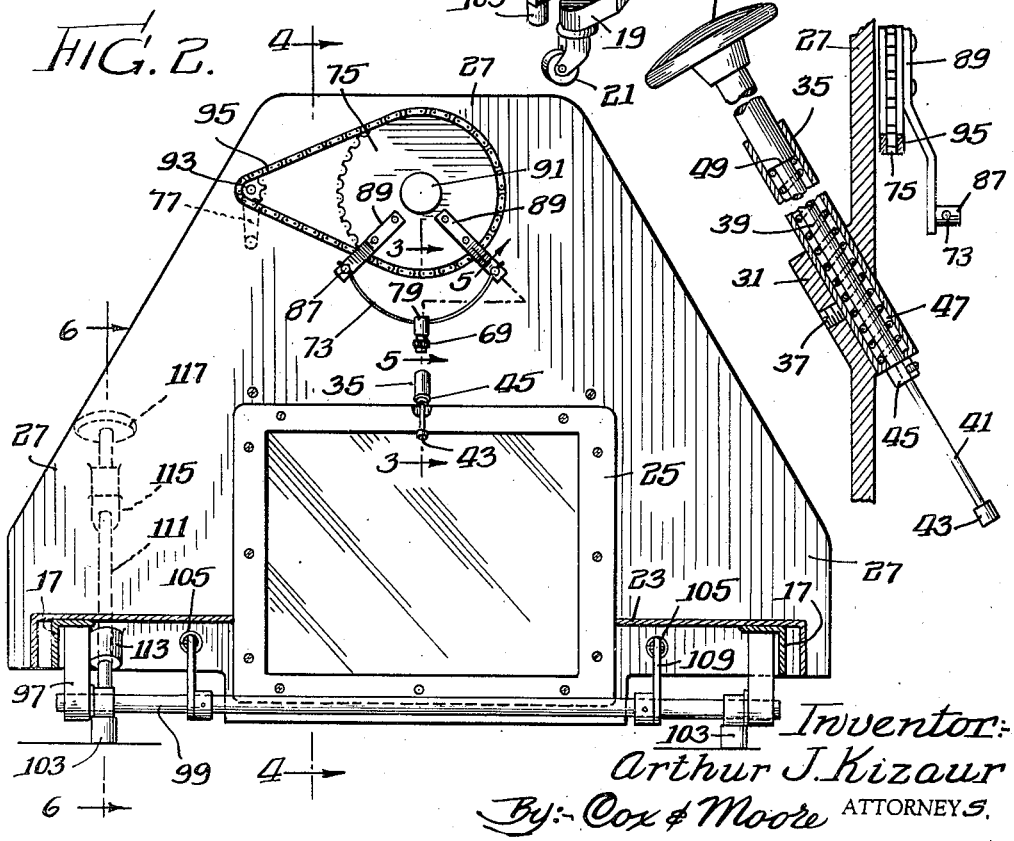
Inventor:
Arthur J. Kizaur
By: Cox & Moore ATTORNEYS Nov. 5, 1940.    A. J. KIZAUR    2,220,246
INSPECTION EQUIPMENT
Filed May 28, 1938    2 Sheets-Sheet 2
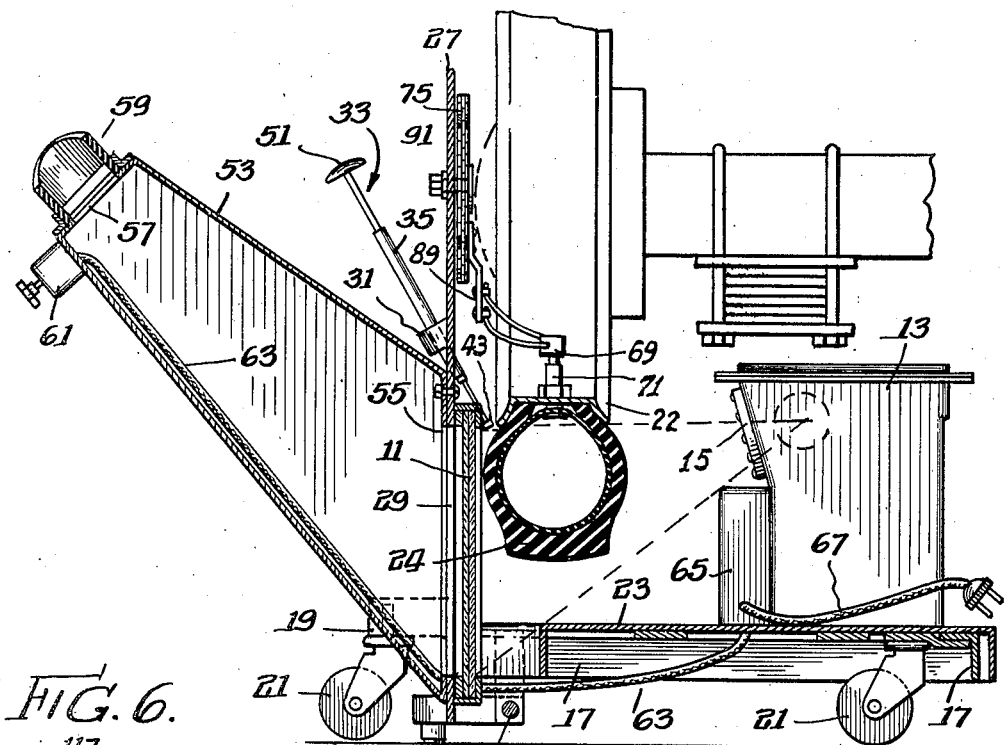
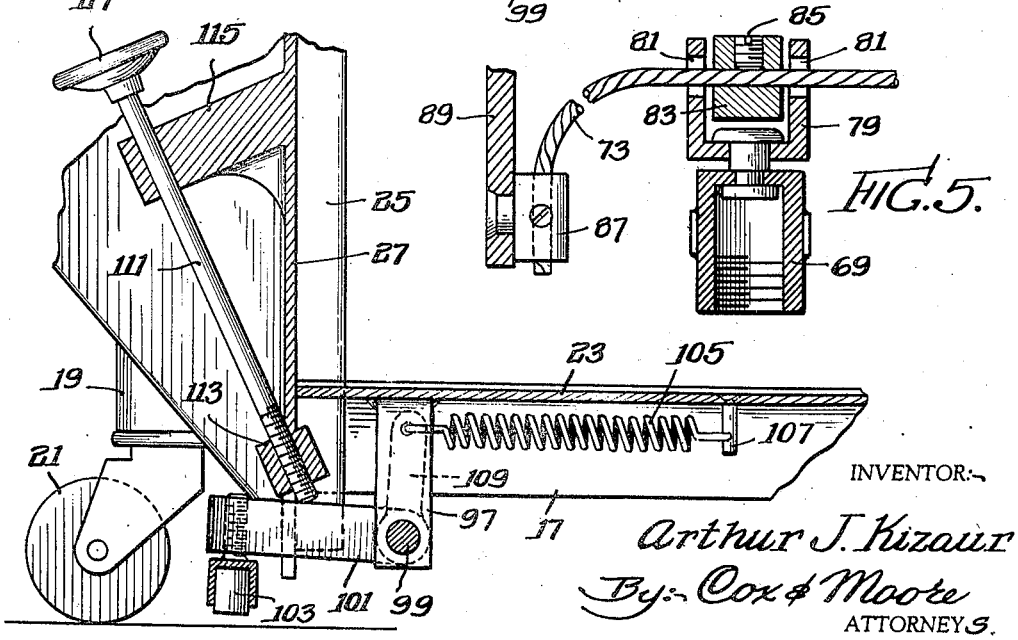
INVENTOR:
Arthur J. Kizaur
By: Cox & Moore
ATTORNEYS Patented Nov. 5, 1940

2,220,246

UNITED STATES PATENT OFFICE 2,220,246

INSPECTION EQUIPMENT

Arthur J. Kizaur, Cicero, Ill., assignor to General Electric X-Ray Corporation, Chicago, Ill., a corporation of New York Application May 28, 1938, Serial No. 210,733

6 Claims. (Cl. 250—152)

The present invention relates in general to inspection apparatus, and has more particular reference to X-ray inspection equipment, the invention pertaining specifically to equipment for inspecting tires, such as the resilient, usually pneumatic, tires commonly used on automotive vehicles.

An important object of the present invention is to provide improved inspection equipment of the character mentioned; a further object being to provide equipment adapted for the inspection of wheel-mounted tires without removing the same from the wheel.

Another important object is to provide equipment for inspecting a movable object, including readily operable means for marking the object at desired places therein during inspection; a further object being to provide means operable to scuff the object for the purpose of marking the same.

Another important object is to provide apparatus for inspecting vehicle wheel mounted tires, including a dolly of improved construction carrying the inspection equipment to facilitate the positioning of the equipment for inspection of a mounted tire; a further object being to provide means on said dolly and readily connectible with the tire carrying wheel of the vehicle, in order to turn the wheel to move the tire progressively through an inspection field.

Among the numerous other objects is to provide readily operable means for anchoring, as on a floor, a movable dolly carrying inspection equipment; to arrange the inspection equipment on a movable support frame, including shielding means formed and arranged so that the equipment cannot be operated save from a position with respect to suitable screening means, wherein the operator is entirely protected against the possibly deleterious effects of X-ray exposure; and to utilize the X-ray screening means as a panel having a source of X-rays on one side in position to impinge upon a fluoroscopic or light-sensitive screen carried on the panel, the panel serving as a support for operative equipment extending on the side thereof opposite from the source, and including a switch controlling said source, a marking device, a tire moving device, and a sighting sleeve permitting the screen to be viewed only from a position in which the operator is entirely protected against X-rays emanating from said source, the control switch being mounted in place operable only when the operator is in a safely screened position.

Numerous other objects, advantages and inherent functions of the invention will become apparent as the same is more fully understood from the following description, which, taken in conjunction with the accompanying drawings, discloses a preferred form of the invention.

Referring to the drawings:

Figure 1 is a perspective view of the inspection equipment embodying the present invention;

Figure 2 is a sectional view taken substantially along the line 2—2 in Figure 1; and Figures 3, 4, 5 and 6, respectively, are sectional views taken substantially along the lines 3—3, 4—4, 5—5 and 6—6 in Figure 2.

To illustrate the invention, the drawings show inspection equipment comprising a source of X-rays in position to direct rays upon a light-sensitive screen 11, the source of light being preferably enclosed in a casing 13, impervious to X-rays and provided with a window 15 through which the light may emerge from the casing 13 in a direction to impinge upon the screen 11.

The equipment is mounted preferably upon a mobile carriage whereby the same may be readily moved into position beneath a vehicle, with the tire carrying rim of the wheel to be inspected extending between the window 15 and the screen 11. To this end, the light source casing 13 and the screen 11 are supported on a dolly preferably comprising angle-irons 17 and castings 19 suitably secured together, as by welding or otherwise, and provided with preferably roller casters 21 to facilitate moving the dolly and the equipment supported thereon. The dolly may also comprise suitable, preferably sheet-metal, means 23 carried on the frame and forming a platform upon which the casing 13 is secured.

The casing 13 may be mounted at the rear of the dolly while the screen 11 is preferably mounted in a frame 25 which is attached on a panel 27 comprising X-rays impervious material, the screen being attached on the side of the panel facing the window 15, the screen 11 being secured on the panel 27 opposite a screen opening 29 in the panel and through which the screen 11 is visible from the side of the panel facing away from the source of X-rays. The panel 27 is mounted on and at the forward end of the dolly in position such that a space is provided between the window 15 and the panel 11 of sufficient size to receive a tire for inspection therebetween.

In order to use the equipment for tire inspection purposes, the wheel carrying the tire to be inspected may be elevated, and to this end a jack may be applied to the axle of the vehicle in order to elevate the wheel 22 carrying the tire 24 sufficiently to permit the equipment to be loaded into position with the lower portions of the tire 24 extending between the window 15 and the screen 11, substantially as shown in Figure 4 of the drawings.

The panel 27 is secured on the dolly in any suitable or convenient fashion, as by welding or bolting it to the angle-irons 17.

The panel 27 is preferably formed as a casting and forms the forward cross-piece of the dolly frame, and the castings 19, which form supports for the front support rollers 21, may be cast integrally with the panel in the lower portions thereof.

Above the window 29, and preferably in line with the medial vertical axis thereof, the panel 27 is preferably formed with an integral projection 31 forming an inclined sleeve having an opening extending at an inclination downwardly through the panel from the front thereof, and this sleeve 31 serves to support a marking device 33 which is shown in detail in Figure 3 of the drawings and which comprises a support sleeve 35 extending through and fastened in the sleeve in any suitable manner, and preferably in demountable fashion as by means of the set screw 37. The sleeve 35 contains a plunger 39 having an end 41 projecting from the lower end of the sleeve 35 and carrying a marking head 43 in position normally extending adjacent the upper edge of the screen 11.

The projecting portion 41 of the plunger is provided with means preferably comprising a collar 45 defining a shoulder on the plunger in position to engage the bottom of the sleeve 35 and limit the upward movement of the plunger in the sleeve.

Within the sleeve is arranged yielding means preferably comprising a helical spring 47 encircling the plunger within the sleeve 35 and bearing at one end on the lower end of the sleeve and at the other end upon a shoulder 49 formed adjacent the upper end of the plunger within the sleeve 35, so that the spring normally tends to urge the plunger upwardly in the sleeve to retracted position wherein the collar 45 engages the lower end of the sleeve and limits the retractive movement of the plunger.

The plunger has an end extending outwardly of the upper end of the sleeve, said end being provided with a manually operable head 51 which may be pushed by the operator from a position in front of the panel 27 to move the marking head 43 downwardly at an angle into the space between the screen 11 and the window 15, whereby said head when so moved may mark the article being inspected, as by scuffing the same, within the inspection field so that an observer watching the image of the article being inspected on the screen 11 may observe the marking operation.

The panel 27 carries an observation sleeve 53, comprising a sheet-metal shell preferably comprising material impervious to X-rays and arranged in the form of a truncated pyramid, the base of said truncated, pyramidal shell defining an opening 55 preferably corresponding with the panel opening 29, the shell, in the illustrated embodiment, having inturned marginal flanges defining said opening 55, said flanges being secured to the forward surface of said panel as by bolting the parts together or otherwise, around the panel opening 29.

The observation sleeve or shell 53 extends outwardly and preferably upwardly of the opening 29 and has an outer end formed with an opening 57, the inspection sleeve carrying eye-shade means 59 at said opening and comprising preferably an annular cuff of preferably flexible material, such as sponge rubber, the outer edge of which is shaped generally to fit the occular area of the face of an observer.

The upper or occular end of the observation sleeve 53 also preferably carries a manually-operable control switch 61 which is connected with the light producing equipment in the casing 13 by suitable cable means 63 which preferably extends from the switch 61 within the sleeve 63, thence through the panel 27 and beneath the platform 23, thence through said platform to a casing 65 adjacent the housing 13 which contains the usual equipment and connections for powering and controlling the operation of the source of X-rays within the housing 13.

The switch 61 preferably provides the ultimate control for operation of the light source so that X-rays may be caused to pass through the window 15 and onto the screen 11 only when the switch 61 is held closed by the operator in position to make an observation through the sleeve 53, the switch 61 being of a character normally biased, as by means of a spring, toward open position, so that the operator, of necessity, is required to occupy a safe position in front of the panel 27 properly screened from X-rays whenever the light source is in operation to project X-rays.

The source of X-rays may be energized under the control of the switch 61 through the control equipment contained within the casing 65 by means of a cable 67 provided with means for connecting the same with any suitable source of electrical power, such as a commercial power distribution network.

The panel 27 is also preferably provided with means adapted for connection with a wheel 22, in order that the same may be turned by the operator to advance the tire within the inspection field, without requiring the operator to leave a safe position in front of the panel, as shown in the illustrated embodiment.

The wheel turning means comprises a preferably threaded cap 69 adapted for threaded engagement on the valve stem 71 of the tire being inspected, the cap 69 being connected preferably by the flexible cords 73 with a rotating carrier 75 mounted on the panel and drivingly connected with a manually-operable handle 77 on and extending forwardly of the panel 27 in position to be turned by the operator, without leaving observing position at the occular end of the observation sleeve 53.

The rotatable carrier 75 is adapted to move the cap 69 when the same is attached on a valve stem 71 in a circular path and thus cause the wheel 22 to turn, the flexibility of the connector 73 being such as to permit the device to function successfully upon wheels of varying size. The effective length of the connector 73 also may be adjusted to accommodate oversize wheels, and to this end the cap 69 is turnably mounted in a cup-shaped carrier 79 having aligned openings 81 through which the cord 73 may extend, the medial portions of the cord being clampingly secured in place by means of a plug 83 within the element 79 and formed with a channel through which extends the cord 73, the cord being held in place in the plug 83 as by means of a set-screw 85. The opposite ends of the cord 73 are adjustably secured as by means of set-screw clamps 87 formed on the ends of arms 89 which in turn are fastened on and in position extending radially of the rotating frame 75.

The frame 75 preferably comprises a relatively large gear supported for rotation on a stub axle 91 which in turn is fastened in the panel 27 preferably on the medial vertical axis thereof above and in line with the marking device 33, and the arms 89 preferably make an angle of ninety degrees with each other on the gear 75.

The driving handle 77 is preferably arranged in the form of a crank upon a stub axle journalled in the panel 27 and carrying a driving pinion 93 in position extending behind the panel and drivingly connected with the gear 75 in any suitable fashion, as by means of the chain 95.

It will be seen from the foregoing that after the equipment is arranged in position, with the cable 67 connected with a suitable source of electrical power and with the cap 69 connected with the wheel, the tire 24 may be subjected completely to X-ray inspection by an operator who remains in safe position at the ocular end of the inspection sleeve 53. To make the inspection, the operator presses the switch 61 and views the image of the tire upon the screen 11 through the sleeve 53. When in such observing position, the operator is entirely protected from X-rays by virtue of the impervious character not only of the panel 27 but also of the observing sleeve 53. In making the inspection, the operator may turn the wheel to advance the tire progressively in front of the panel 11 by manipulating the crank 77 but without leaving the safe observing position.

If any defect is noted in the tire under inspection, the same may be marked on the tire by depressing the handle 51 of the marking device. Depressing the handle 51 causes the marking head 43 to project into the inspection field so that the image of the marking head may be seen on the screen 11 by the observer as the mark is made. The observer thus may see whether or not the mark is applied exactly opposite the tire defect. Operation of the marking device also is accomplished by the observer without leaving the safe inspecting position.

Since the equipment is mounted on a mobile carriage or dolly, it is desirable to provide for anchoring the equipment immovably after the same has been in position to accomplish tire inspection. To this end the carriage or dolly is provided with downwardly extending brackets 97 which may be secured, as by welding, upon the under side of the lateral angle pieces 17 comprising the frame. These brackets form journals for supporting a shaft 99 having arms 101 fitted with feet 103 in position to engage the floor on which the dolly rests. These feet 103 may comprise rubber or other means adapted to frictionally engage the floor to anchor the dolly in place when the feet are depressed. The feet are normally carried in raised or retracted position by yielding means preferably comprising helical springs 105, each anchored at one end on lugs 107 on the dolly frame and at the other on an arm 109 formed on the shaft 99.

In order to depress the feet, means is provided for rotating the shaft 99 against the retractive urge of the springs 105, and in the illustrated embodiment this is accomplished by means of a stem 111 having an end threaded in a sleeve 113 preferably formed integrally on the panel 27, the end of the stem 111 extending in position to bear upon one of the arms 101 so that by advancing the stem 111, as by turning it in the sleeve 113, the shaft 99 may be rotated in a direction to project both of the feet 103 downwardly, in order to lift the forward rollers 21 of the dolly frame from the floor, thereby anchoring the dolly in place.

For manipulative convenience, the stem 111 is arranged in position inclined forwardly of the panel 27, the upper end of the stem 111 being rotatably supported in a projecting lug 115 preferably integral with and forming a part of the panel 27, and the upper end of the stem 111 may be formed with a convenient operative handle 117.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. Inspection apparatus for vehicle mounted tires, comprising a support frame adapted to extend beneath a vehicle mounted tire, a shield on said frame in position to extend on one side of the tire, said shield being substantially impervious to X-rays and having an opening in position opposite said tire, a screen comprising a substantially vertically extending panel sensitive to X-rays on said shield at said opening, a source of X-rays on said frame and spaced from said shield and screen and mounted in position to extend on the side of said tire opposite from said shield in substantially horizontal alignment with the upper portions of said screen, in position to direct X-rays through said tire, substantially horizontally toward the upper portions and downwardly upon the lower portions of said screen, said screen being visible in said opening from an inspection station on the side of said shield remote from said source of X-rays, said frame comprising a mobile carriage to facilitate arrangement thereof in position beneath a vehicle to permit inspection of a wheel mounted tire thereon, and anchoring means on said frame and operable from the side of said shield remote from said source for immobilizing said carriage in tire inspecting position.

2. Inspection apparatus as set forth in claim 1, including tire marking means on said frame adjacent said tire and movable from a retracted position into marking contact with the tire, and means operable entirely from the side of said shield remote from said source for so projecting said marking means.

3. Inspection apparatus for vehicle mounted tires, comprising a support frame adapted to extend beneath a vehicle mounted tire, a shield on said frame in position to extend on one side of the tire, said shield being substantially impervious to X-rays and having an opening in position opposite said tire, a screen comprising a panel sensitive to X-rays on said shield at said opening, a source of X-rays on said frame and spaced from said shield and screen and mounted in position to extend on the side of said tire opposite from said shield in substantially horizontal alignment with the upper portions of said screen, said screen being visible in said opening from an inspection station on the side of said shield remote from said source of X-rays, marking means comprising a movable member on said frame and normally held in retracted position, said marking means having tire marking portions adapted to engage said tire when said marking means is projected from retracted position, and actuating means operably connected with said marking means for projecting the same from retracted position for marking the tire, said actuating means being manually operable on the side of said shield remote from said source of X-rays.

4. Inspection apparatus as set forth in claim 3, wherein said marking means comprises a stem having a tire marking tip facing the tire, said stem being axially movable from its retracted position toward the tire upon operation of said actuating means.

5. Inspection apparatus for vehicle mounted tires, comprising a support frame adapted to extend beneath a vehicle mounted tire, a shield on said frame in position to extend on one side of the tire, said shield being substantially impervious to X-rays and having an opening in position opposite said tire, a screen sensitive to X-rays disposed at said opening, a source of X-rays on said frame and spaced from said shield and screen in position to extend on the side of the tire opposite from said shield and to direct X-rays through said tire and onto said screen, said frame comprising a mobile carriage to facilitate the arrangement thereof in position beneath a vehicle to permit inspection of a wheel mounted tire thereon, anchoring means on said frame and operable from the side of said shield remote from said source for immobilizing said carriage in tire inspecting position, and tire turning means adapted for driving connection with said mounted tire and operable on the side of said shield remote from said source to progressively turn the tire in place and move the same between the source and said screen.

6. Inspection apparatus as set forth in claim 5, wherein said tire turning means comprises a turnable member rotatable on said shield and having a fitting for detachable connection with the vehicle wheel for turning the same and the tire thereon.

ARTHUR J. KIZAUR.